UNITED STATES PATENT OFFICE.

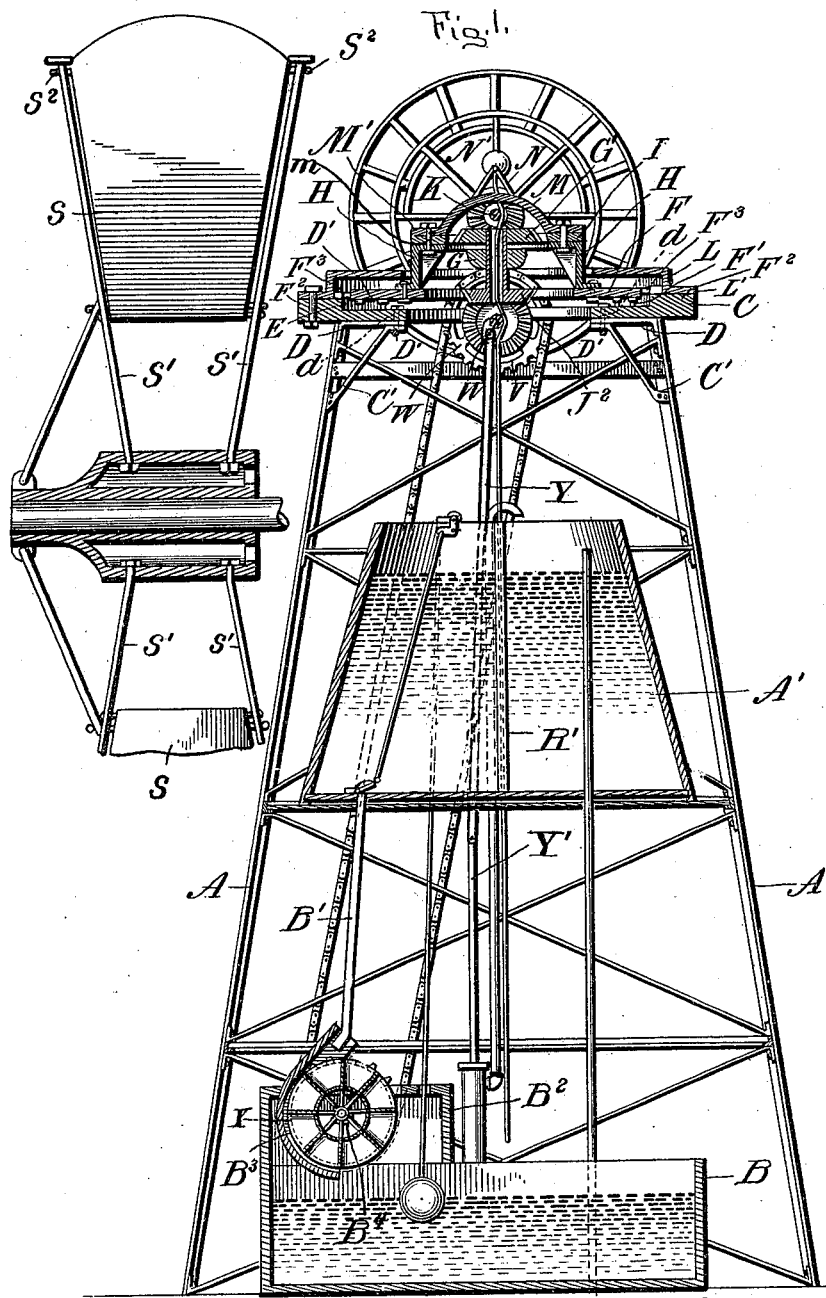

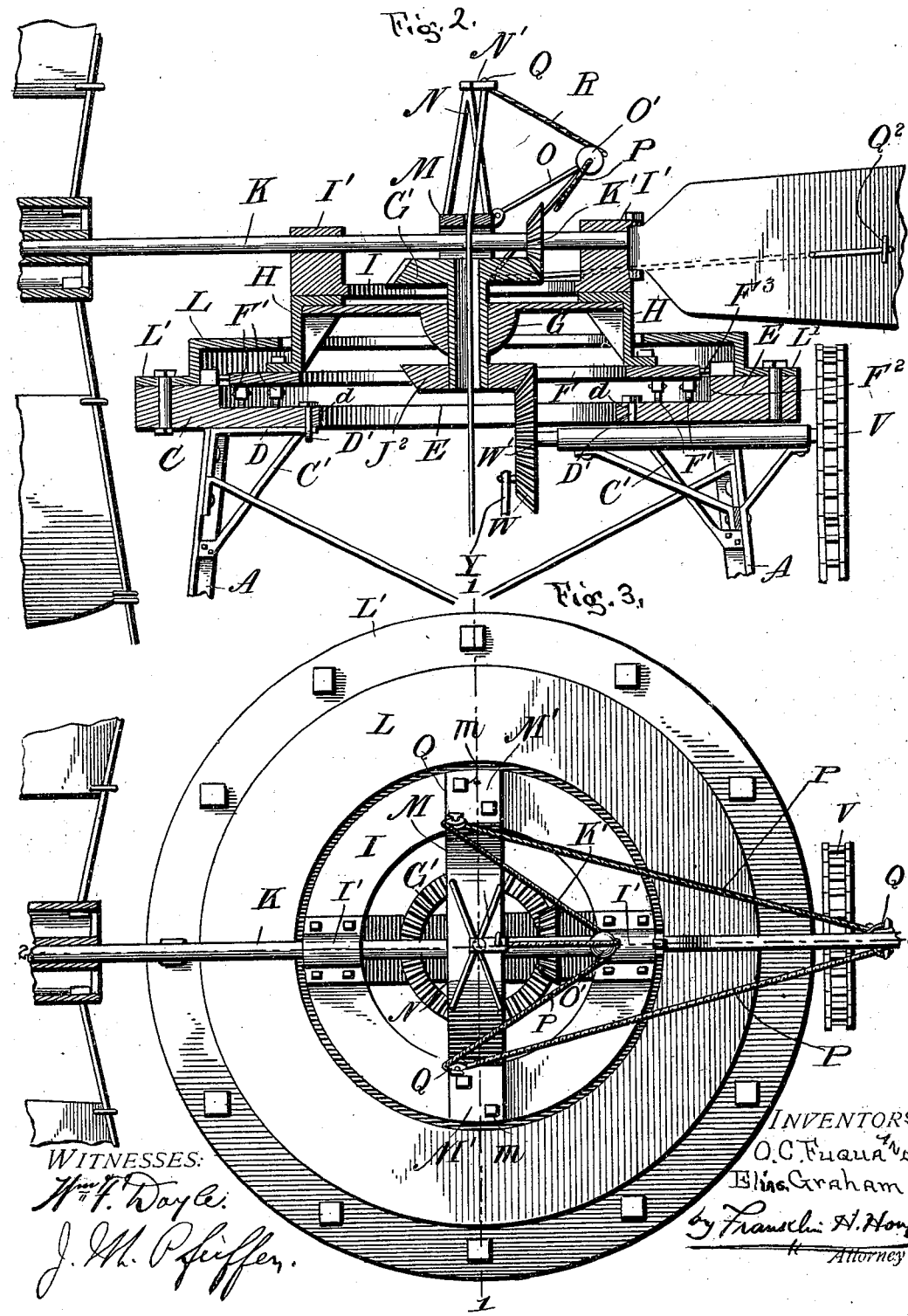

OWEN C. FUQUA AND ELIAS GRAHAM, OF CASEY, ILLINOIS.

WIND AND WATER POWER PUMP.

SPECIFICATION forming part of Letters Patent No. 684,054, dated October 8, 1901.

Application filed June 8, 1901. Serial No. 63,824. (No model.)

*To all whom it may concern:*

Be it known that we, OWEN C. FUQUA and ELIAS GRAHAM, citizens of the United States, residing at Casey, in the county of Clark and State of Illinois, have invented certain new and useful Improvements in Wind and Water Power Pumps; and we do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in wind and water power pumps, and especially to improvements upon Patent No. 672,762, of April 23, 1901; and it consists in various details of construction and arrangements of parts, which will be hereinafter more fully described and then specifically defined in the appended claims.

The invention is clearly illustrated in the accompanying drawings, which, with the letters of reference marked thereon, form part of this application, and in which drawings similar letters of reference indicate like parts throughout the several views, in which—

Figure 1 is a central vertical section through the tower and apparatus and taken on line 1 1 of Fig. 3, parts being shown in elevation. Fig. 2 is a vertical central section through the tower and attachments on line 2 2 of Fig. 3. Fig. 3 is a top plan view. Fig. 4 is a longitudinal sectional view through the hub of the wind-wheel.

Reference now being had to the details of the drawings by letter, A A designate the upright legs of the tower of our apparatus, on which is supported a tank or reservoir A'. Beneath said tank and near the bottom of the tower is a second tank B, which receives the overflow from the tank A, said overflow passing through the pipe B' and utilized to drive the overshot wheel $B^2$, which is mounted upon a shaft $B^3$, which is suitably journaled in the bearings $B^4$. This overshot wheel is mounted within a suitable casing and is similar in construction and operation to the wheel illustrated in the patent above referred to, and hence forms no part of the present application, and it is thought further illustration and description of the same are unnecessary, said wheel being driven by water from the tank A', passing through a pipe the inlet to which is regulated by means of the float-actuated valve. (Not illustrated.)

Mounted upon the top of the tower, the legs of which are made, preferably, of angle-iron suitably braced, is a platform C, which is anchored to said legs by means of braces C', which are fastened at their lower ends to the angle-iron legs and at their upper ends to the bed-braces D, under which the yokes D' pass, the ends of said yokes passing through apertures $d$, adjacent to the margin of the central recess E in said platform. By this means the platform is securely anchored to the tower. Mounted upon said platform is a rotary plate F, which has a series of caster-wheels F' mounted in slots therein, said caster-wheels adapted to rest upon the top of said platform in a recess therein. In a shoulder $F^2$, formed by recessing the top of said platform, are mounted the antifriction-rollers $F^3$. At suitable intervals about said shoulder and at locations about the rotary plate adjacent to the inner margin are securely fastened the ears H, and fastened to two of these ears at locations diametrically opposite are the ends of the yoke G. This yoke is centrally and vertically apertured to receive a shaft J, which has a bevel-gear G' keyed to its upper end and a similar bevel-gear $J^2$ keyed to its lower end. Mounted upon the top of said yoke is a plate I, which has two bearings I', in which the wind-wheel shaft K is journaled, said shaft having a gear-wheel K', which is in mesh with the bevel-gear J'. L designates a hood having a flange L' about its bottom, said flange having a series of apertures through which bolts are passed after said hood has been superimposed over the rotatable plate and after the flange rests upon the upper face of said platform adjacent to its outer edge. These bolts are passed through registering apertures in the flange and platform and securely hold the hood to the latter, allowing the plate F to freely rotate and with it the wind-wheel shaft and bearings.

M designates a yoke which has flanged ends M', which are apertured at $m$, said flanges adapted to be bolted to the plate I at right angles to the shaft having bearings in said plate. Rising from said yoke M are the tripod-legs N, having an eye N' at their upper ends, and mounted on said yoke M is a ball-rod O, having a ball O' at one end, and secured to said ball-rod is a cord P, which passes over a pulley Q and is fastened to the weather-vane at the point Q². Another cord or chain is similarly connected to the opposite side of the weather-vane, passes under a pulley, and is fastened to the ball-rod on the other side. Fastened to the end of said ball-rod is a cord or rope R, which passes through the eye N', thence through the aperture in the yoke M, and down through the hollow gear-shaft J and through a tube R', which passes through the tank A' and is within convenient reach of the operator. This cord is provided for the purpose of throwing the weather-vane into and out of gear.

Mounted upon the outer end of the shaft K is a vertically-disposed wind-wheel having a series of blades S, comprising radiating arms S', to which the blades are secured by eyes S² at the corners of said blades, which are inserted over said radiating arms and held thereto in any suitable manner.

A sprocket-wheel V, keyed to the stub-shaft W', carries a sprocket-chain X, which turns about a sprocket-wheel on the water-wheel, whereby surplus power may be transmitted to the shaft W'. A pitman Y has pivotal connections between a crank on the gear-wheel W and a pump-piston Y'.

In shifting the vane the rope R is pulled until the ball-rod has approached nearly a perpendicular position, when a sharp pull is made, and the vane being in a swinging motion the ball-rod is carried past the center, and by immediately slacking the rope the weight of the ball carries the vane in position. By this operation the vane is thrown in either direction always when the ball-rod is approaching near the perpendicular line by a sharp pull followed by a slack rope, the ball being carried beyond the center and the weight carrying the vane into position. The movement of the vane and ball-rod acts as a balance-wheel in carrying the ball beyond center.

Having thus described our invention, what we claim as new, and desire to secure by Letters Patent, is—

1. A wind and water power pump, comprising in combination with a tower with platform mounted thereon, a rotatable plate, wheels mounted in said plate adapted to rest upon said platform, lugs upon said rotatable plate, a yoke secured to said lugs, a vertically-mounted shaft journaled in a central aperture in the yoke, a bearing-plate resting upon said yoke, a wind-wheel shaft journaled in said bearing-plate, a gear-wheel mounted on said shaft, gear-wheels mounted on the ends of said vertically-mounted shaft carried by the yoke, a sprocket-wheel having geared connections with the shaft carrying the wind-wheel, a pump and connections between the piston therein and the sprocket-carrying shaft, as set forth.

2. A wind and water power pump, comprising the tower, the platform, a rotatable plate, wheels carried by said plate and resting upon said platform within a recess therein, antifriction-wheels in the shoulder formed by said recess, lugs rising from the rotatable plate, a yoke having angled ends secured to said lugs, a bearing-plate secured to said yoke, a hood having a flange, which hood is adapted to be placed over the marginal edge of the rotatable plate, and resting upon said platform to which it is secured, a wind-wheel shaft mounted in said bearing-plate, a pump and piston therein, and geared connections between same and said wind-wheel shaft, a weather-vane and means for throwing the same in and out of gear, as set forth.

3. A wind and water power pump, comprising in combination with the tower, the platform mounted thereon, a rotatable plate, wheels carried by said plate, and adapted to rest upon said platform, lugs rising from said rotatable plate, a yoke secured to said lugs, a bearing-plate resting over said yoke and lugs, and secured thereto, a wind-wheel shaft journaled in said bearing-plate, a pump with piston, geared connections between said piston and the wind-wheel shaft, a second yoke M mounted upon said bearing-plate, a weather-vane and ball-rod secured to said yoke M, a standard on the yoke carried by the bearing-plate, rope or chain connections between said vane and ball-rod, and an operating-rope passing through an eye in said standard, as set forth.

In testimony whereof we hereunto affix our signatures in presence of two witnesses.

OWEN C. FUQUA.
ELIAS GRAHAM.

Witnesses:
N. A. EWING,
JESSE A. GARRETT.